Figure 1:
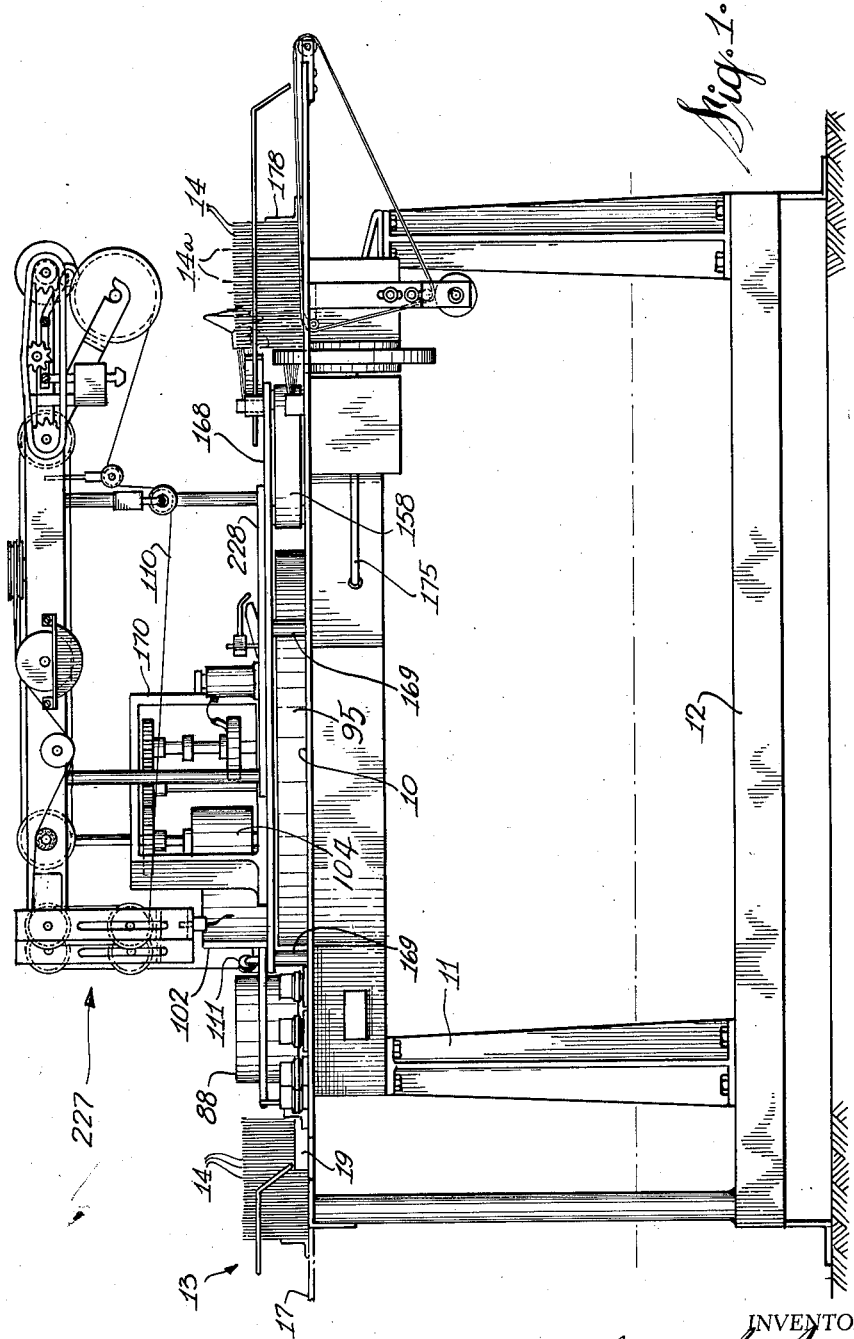

July 5, 1966  J. R. PAULSON  3,259,031
TEAR STRIP APPLYING MACHINE
Filed Aug. 5, 1963  9 Sheets-Sheet 1

INVENTOR
John R. Paulson
BY Harold A. Weir
PATENT AGENT

July 5, 1966  J. R. PAULSON  3,259,031
TEAR STRIP APPLYING MACHINE
Filed Aug. 5, 1963  9 Sheets-Sheet 2

INVENTOR
John R. Paulson
BY Harold C. Weir
PATENT AGENT

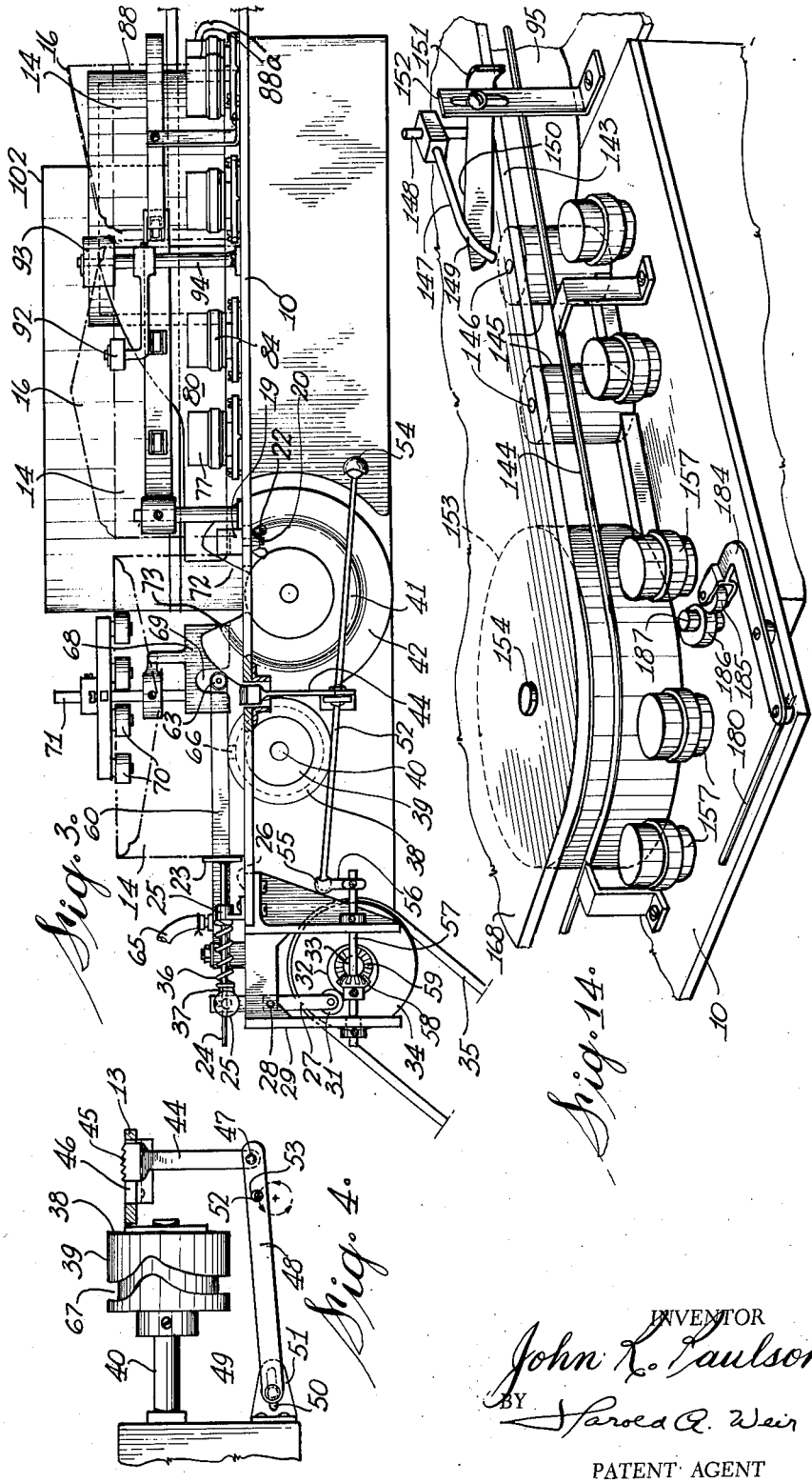

INVENTOR
John R. Paulson
BY Harold E. Weir
PATENT AGENT

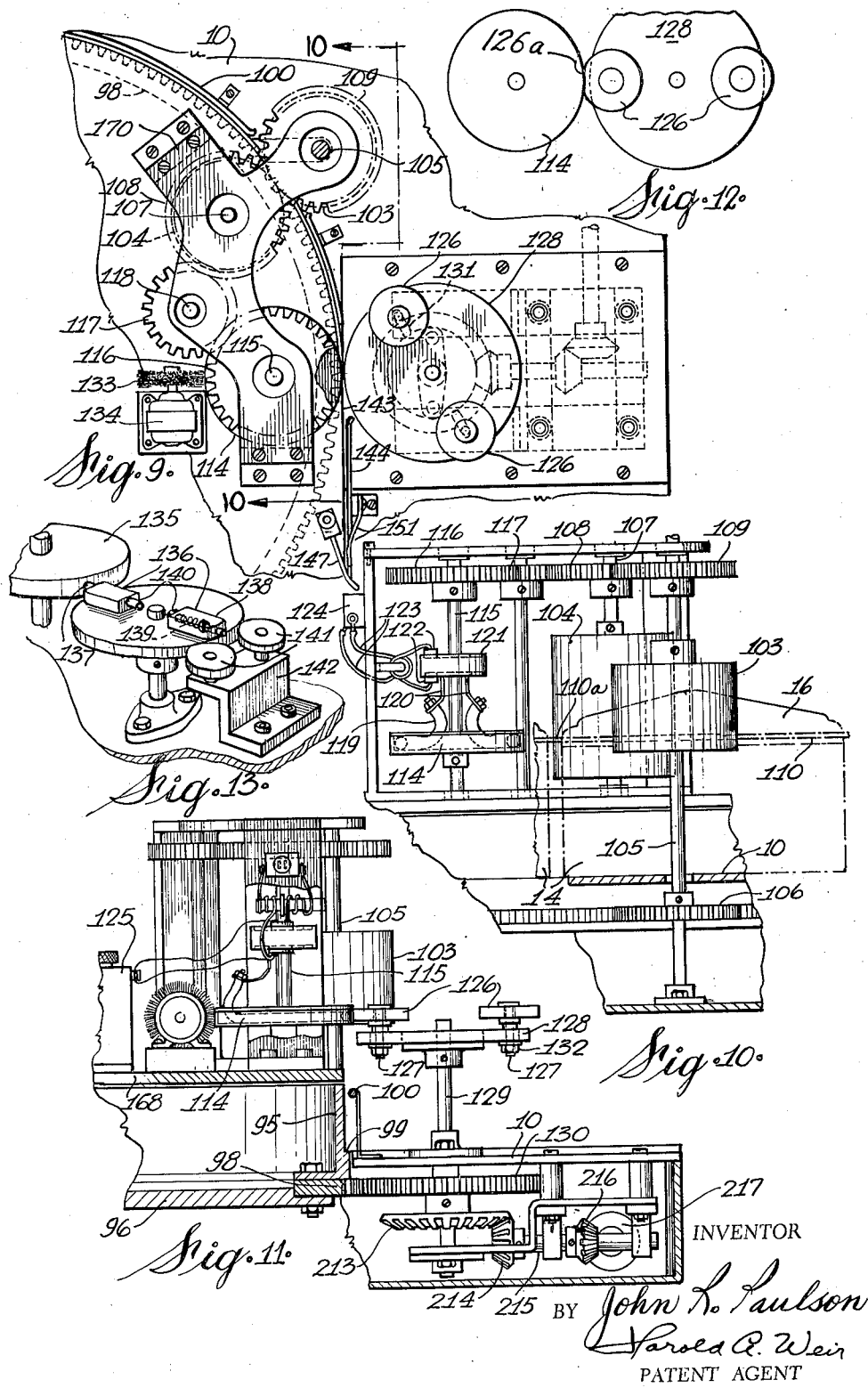

July 5, 1966  J. R. PAULSON  3,259,031
TEAR STRIP APPLYING MACHINE
Filed Aug. 5, 1963  9 Sheets-Sheet 6
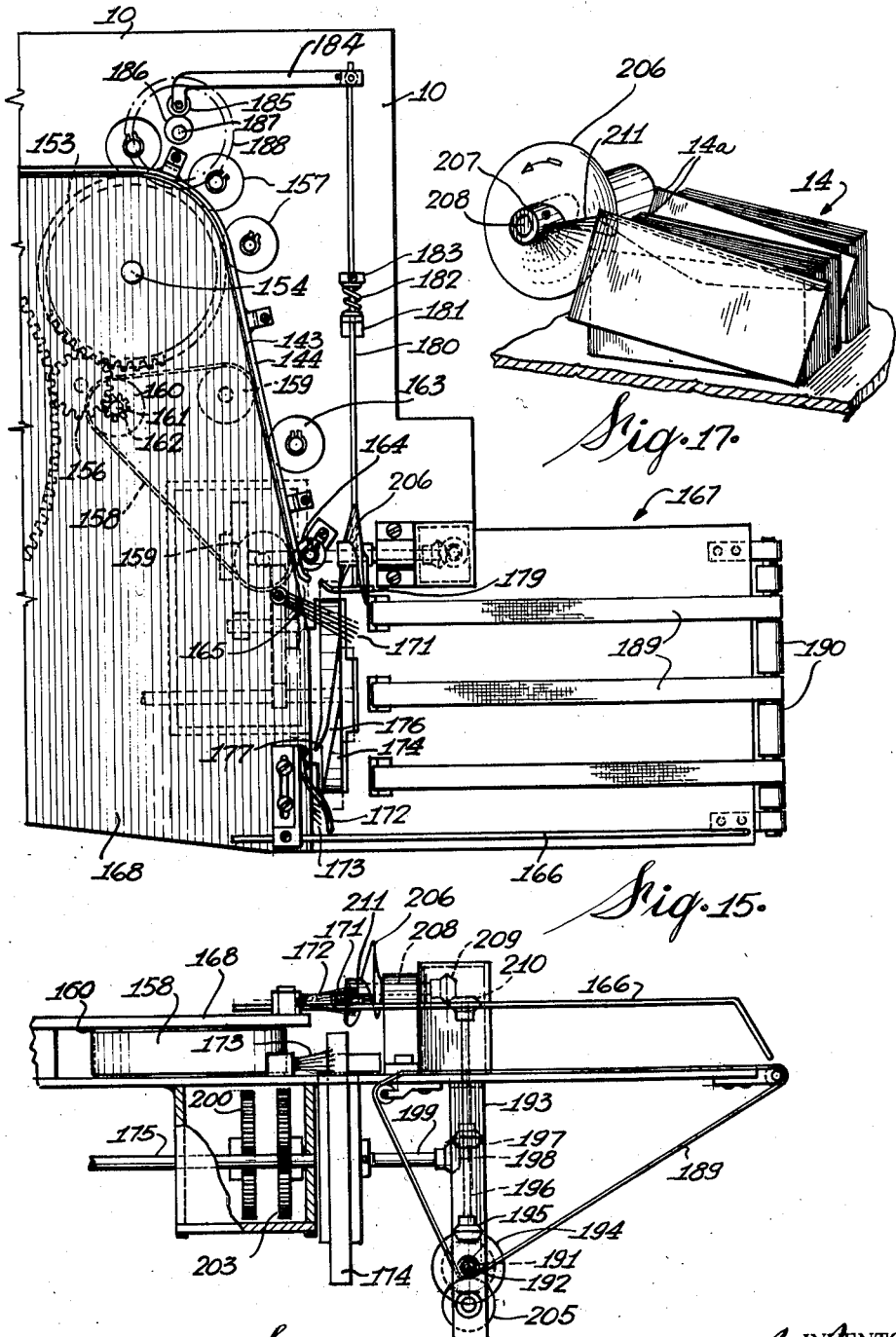
INVENTOR
John R. Paulson
BY
Harold Q. Wein
PATENT AGENT

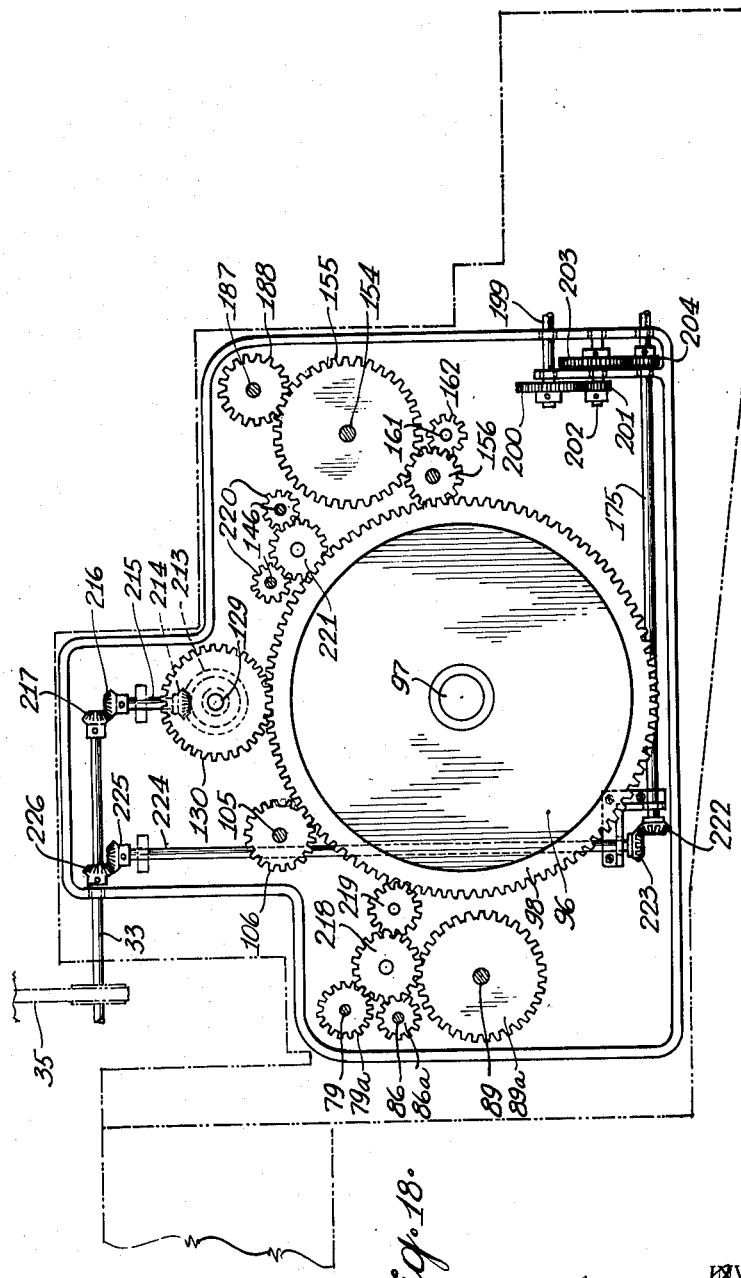

July 5, 1966 J. R. PAULSON 3,259,031
TEAR STRIP APPLYING MACHINE
Filed Aug. 5, 1963 9 Sheets-Sheet 8
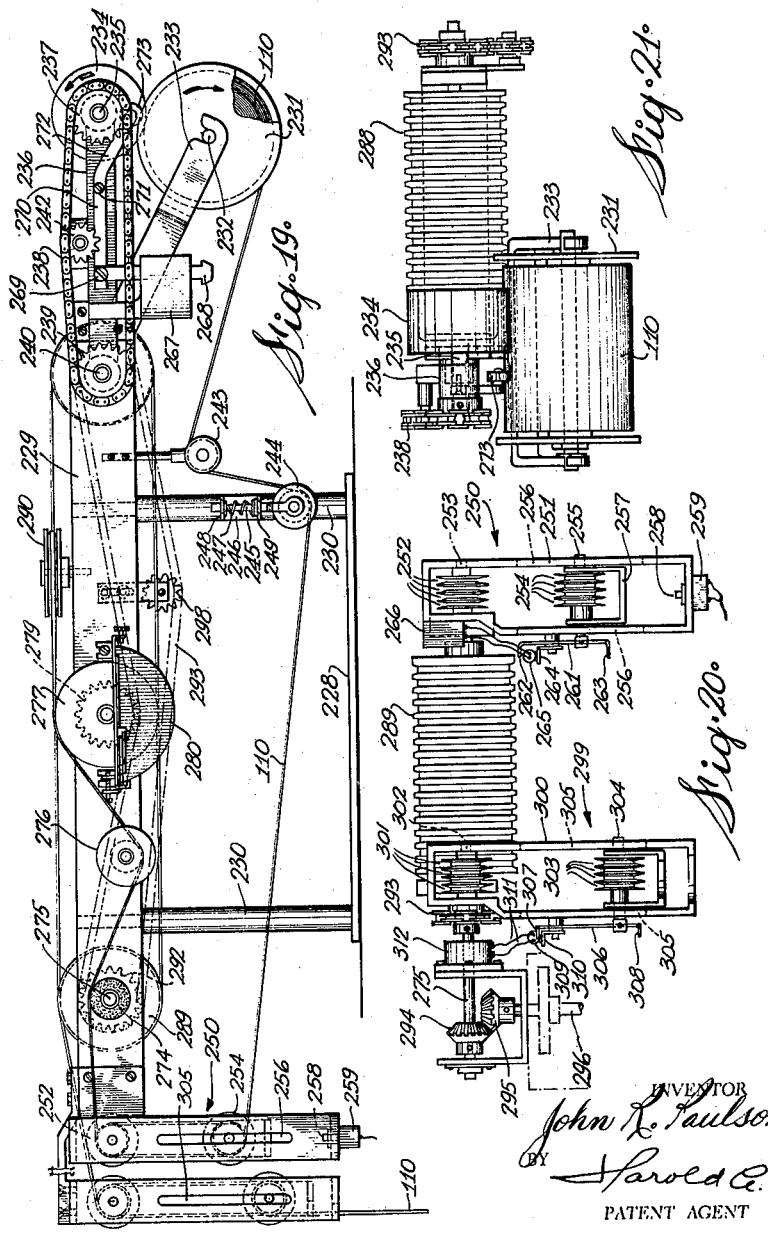

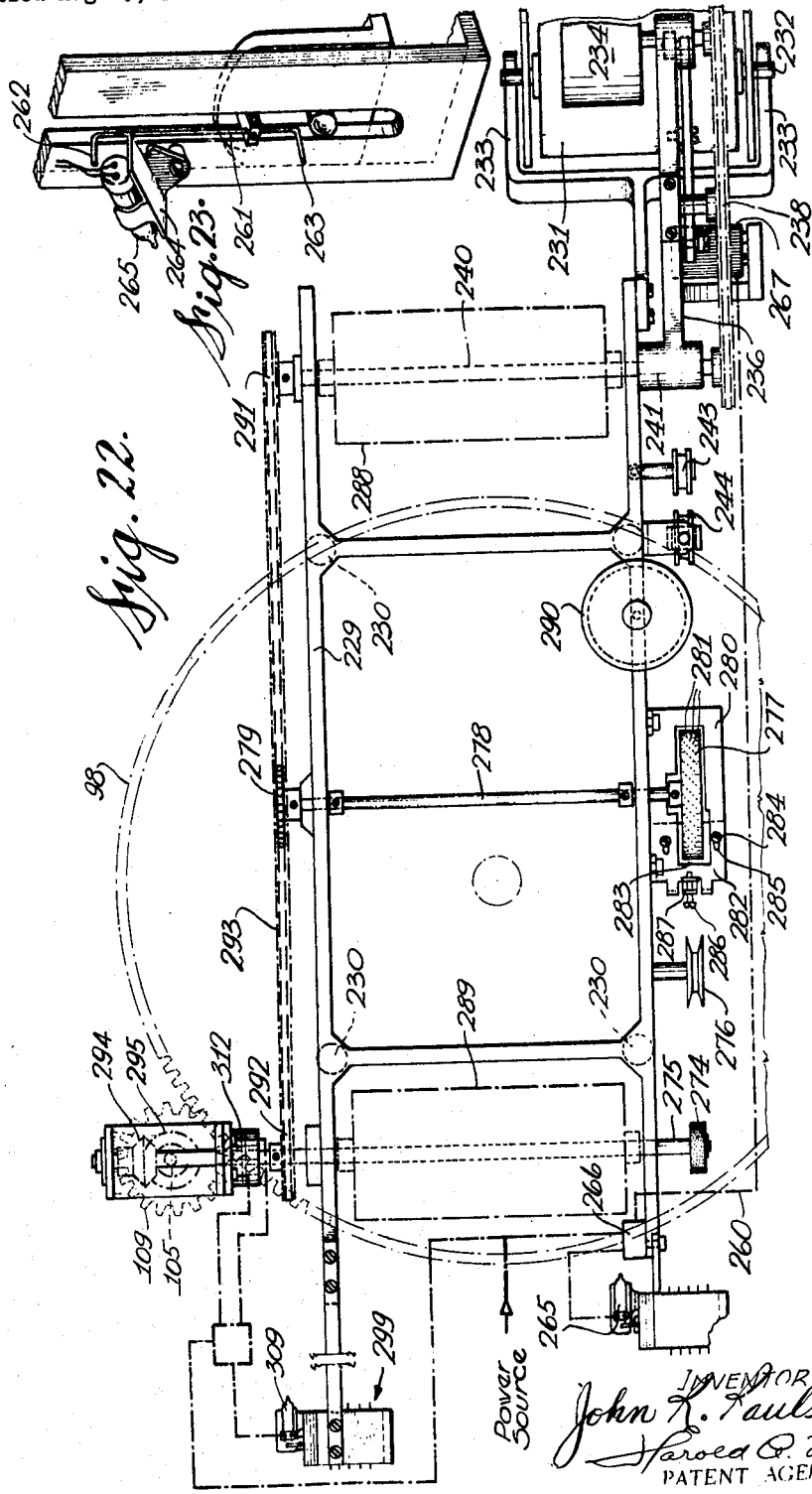

3,259,031
TEAR STRIP APPLYING MACHINE
John R. Paulson, Lachute, Quebec, Canada, assignor to Paulson Machine Company Limited, Lachute, Quebec, Canada
Filed Aug. 5, 1963, Ser. No. 299,789
10 Claims. (Cl. 93—61)

This invention relates to a machine for applying tear strips to packaging articles and materials.

The provision of tear strips to facilitate the removal of the packaging material from various articles is an expedient that has achieved widespread use in the packaging field. Since the cost of packaging is a major factor in article distribution, the cost of providing tear strips, even though the convenience to the ultimate user is great, frequently either prohibits their use or results in the provision of tear strips which do not satisfactorily perform their function.

For instance, the commonly used mailing envelope is seldom, if ever, provided with a tear strip largely because of the additional cost involved as well as the fact that such tear strips, as heretofore proposed, either mar the appearance of the envelope or reduce the effectiveness of its enclosure forming capacity. Again, despite the fact that many food and other products are packaged in bags of polyethylene and like material, tear strips are seldom provided even though such bags are difficult to open.

It is an object of this invention to provide a machine for applying tear strips to packaging materials in a relatively inexpensive, rapid, and effective manner.

A more specific object is to provide a machine for adhesively applying from a substantially continuous supply of plastic composition strip material tear strips of such material successively to a series of packaging devices.

The machine of the present invention comprises broadly an article supporting table, means defining a path of travel on the table, a plurality of article moving devices mounted on the table in successively arranged relation along the path of travel, one of the article moving devices comprising a pair of driven nipping rolls for reception therebetween of the articles, and means for feeding an adhesive-coated continuous tear strip between such rolls for application to the articles.

The machine also includes means for severing the applied tear strip between the articles.

The machine also includes associated article stacking, folding, and counting devices.

A further important feature of the invention resides in means for feeding the tear strip in satisfactory condition for application to the articles.

An additional important feature resides in the provision of suitable driving mechanism for the machine.

Other features and details of importance will appear from the ensuing description.

Figure 2:
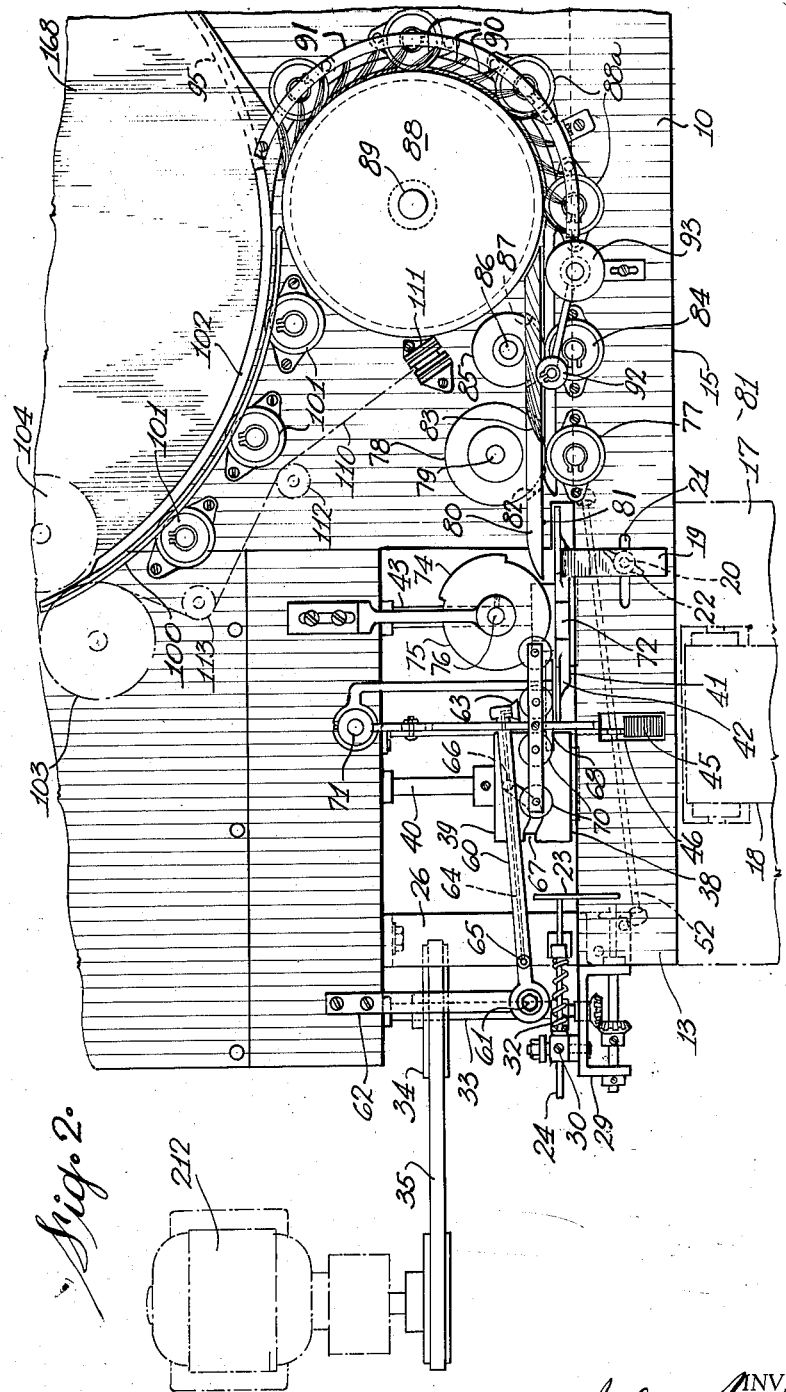

The invention will be described with reference to the accompanying drawings, in which FIGURE 1 is a side elevation of a machine in accordance with the invention, FIGURE 2 is a partial plan view, FIGURE 3 is a partial side elevation, FIGURE 4 is an end elevation of a portion of a feeding mechanism, FIGURES 5 to 8, inclusive, are plan views illustrating various successive positions of a feeding mechanism, FIGURE 9 is a partial plan view of a tear strip applying and severing mechanism, FIGURES 10 and 11 are partial side elevations of the mechanism shown in FIGURE 9, FIGURE 12 is a plan view of a portion of a strip severing device, FIGURE 13 is a perspective view of an alternative form of strip severing device, FIGURE 14 is a perspective view of a closure flap folding device, FIGURE 15 is a plan view of the discharge end of the machine, FIGURE 16 is a side elevation of such discharge end, FIGURE 17 is a perspective view of an envelope counting device, FIGURE 18 is a plan view of a driving gear arrangement, FIGURE 19 is a side elevation of a tear strip handling device, FIGURE 20 is an end elevation of a portion of the strip handling device, FIGURE 21 is an end elevation of another portion of the strip handling device, FIGURE 22 is a plan view of the strip handling device, and FIGURE 23 is a perspective view of a portion of the strip handling device.

The machine comprises a table 10 supported on a frame 11 mounted on a suitable base 12.

The table has a feed section 13 adapted to receive a stack of articles to which a tear strip is to be applied. In the modification illustrated, certain elements thereof have been designed for the treatment of envelopes, and the modification will be described with particular reference to the treatment of envelopes although it will be recognized that the machine may be employed, with minor changes, to the treatment of other objects or articles.

The envelopes 14 are adapted to be placed on the feed section in a stack, the bottom edges of the envelopes being in engagement with the surface of the feed section and the top or closure flap edges in uppermost position and the back or closure flap side of each envelope confronting the forward edge 15 of the table. The closure flap of the envelope is indicated at 16. Means may be provided for feeding the envelopes in stacked relation to the feed section 13 and, as shown, comprises a platform 17 extending forwardly from the feed section and provided with a conveyor 18.

Means are provided for accurately positioning and confining the initially fed portion of the envelope stack and comprises a block 19 fixed upon the table feed section. In order to accommodate various sizes of envelopes the block is adjustably positioned by means of a supporting bolt 20 fixed to the block and extending through a slot 21 in the table and provided with a locking wing nut 22. In opposed relation to the block 19 is a plate 23 carried by a rod 24 mounted on the table. It will be observed that one end of the stack engages block 19 and the opposed end of the stack engages plate 2/1.

In order further to assure accurate and aligned positioning of the envelopes in the stack, plate 23 is subjected to vibratory movement to exert a tapping action on one end of the stack. As shown, rod 24 is reciprocably mounted in a bearing 25 mounted on frame member 26 fixed to the table. A lever 27 is pivoted at 28 on a frame member 29 fixed to the table and has one end fixed to the rod 24 by means of a set screw 30. The other end of lever 27 is provided with a roller 31 in engagement with the eccentric edge of a rotary cam 32 fixed to a shaft 33 journalled in the frame. Shaft 33 is driven by means of a pulley 34 thereon and belt 35. A spring 36 on rod 24 has one end engaging bearing 25 and its other end ending a stop 37 fixed to the rod 24.

It will be appreciated that, in the at rest position of spring 36, the confronting surfaces of plate 23 and block 19 are spaced apart a distance substantially equal to the length of the envelope under treatment. Plate 23 is also adjustable as to its spacing from block 19 to accommodate various sizes of envelopes by adjustment of the position of attachment of lever 27 on the rod by means of set screw 30. It will also be apparent that, as cam 32 rotates, it will impart a short stroke reciprocal movement to rod 24 and plate 23.

The inner face of the envelope stack on the feed section 13 abuts an annular end surface 38 on a rotary cam 39 fixed to a driven shaft 40 journalled in the frame, and an annular end surface 41 of a rotary disc 42 fixed to a driven shaft 43 also journalled in the frame.

Means for urging the stack into abutment with surfaces 38 and 41 comprises an arm 44 one end of which carries a serrated surface shoe 45 disposed in a slot 46 in the table section 13. The other or lower end of arm 44 is pivotally connected at 47 to one end of a link 48. The other end of link 48 has a sliding pivotal connection with the main frame by means of a pin 49 extending through a slot 50 in a bracket 51. A rod 52 extends through a hole 53 in link 48 and has one end oscillatably mounted in the frame by means of ball and socket joint 54 and its other end oscillatably mounted by means of ball and socket joint 55 in an arm 56 fixed to a shaft 57 journalled in frame member 29 and driven from shaft 33 by means of bevel gears 58 and 59. It will be apparent that revolution of arm 56 will impart a rotary path of movement (illustrated in FIGURE 4) to link 48 and the lower end of arm 44. Thus, shoe 45 will have a path of movement wherein its serrated surface moves rearwardly when disposed slightly above the table surface (i.e., in engagement with the stack) and forwardly when disposed below the table surface, i.e., in disengagement with the stack.

Means are provided for feeding envelopes singly in successive order from the stack. Such means includes an arm 60 one end of which is pivotally mounted at 61 on a frame member 62 whereby the arm has swinging movement about a normally vertical axis. Arm 60 has a suction cup 63 at its free end to which suction may be applied through a passage 64 in the arm and a vacuum connection 65 communicating therewith. Means for swinging the arm 60 in a fixed pattern of movement comprises a pin 66 carried by and depending from arm 60, such pin extending into a continuous cam groove 67 in the cylindrical surface of cam 39.

Figure 5:
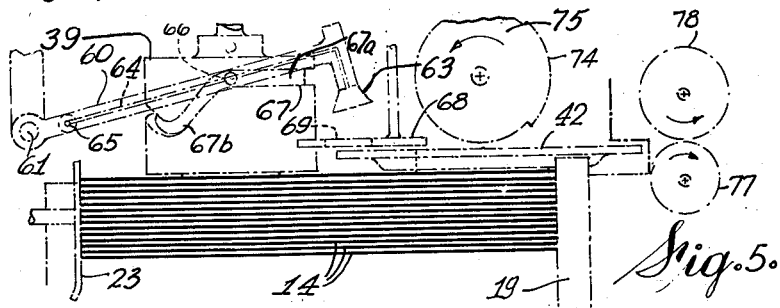
Figure 6:
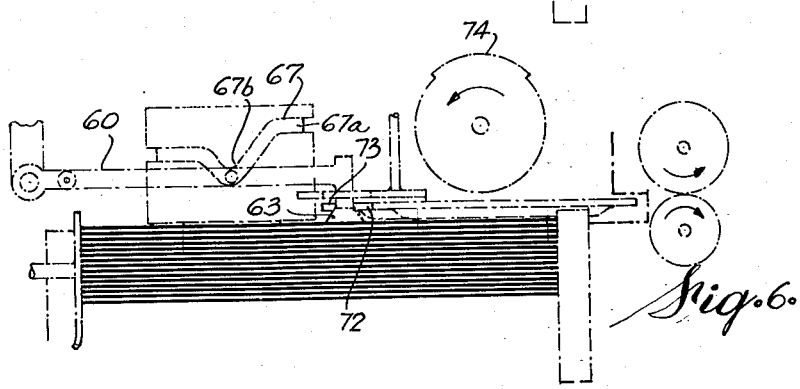
Figure 7:
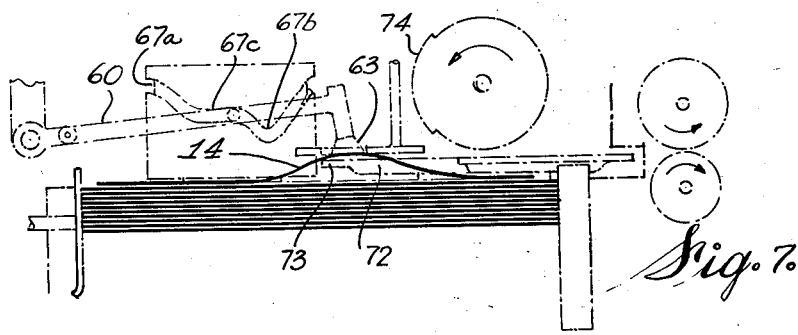
Figure 8:
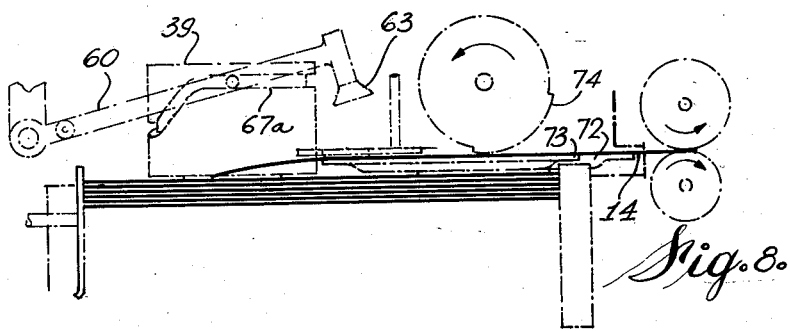

The sequence of movement of the arm 60 is graphically illustrated in FIGURES 5 to 8, inclusive. Referring to FIGURE 5, the suction cup 63 of the arm is at its maximum distance from the stack as a result of engagement of pin 66 with the walls of a straight portion 67a of groove 67 disposed at the maximum distance from the stack. As the cam 39 rotates, the pin 66 approaches the stack as it traverses a sharp bend portion 67b of the groove and engages the initial envelope in the stack as it arrives at the bend, as shown in FIGURE 6. With such initial envelope adhering to the suction cup, the latter moves away from the stack as the pin moves out of the bend in the groove, as shown in FIGURE 7. Thus, the envelope is bowed outwardly from the stack as clearly indicated, in which position it is engaged and supported by a plate 68 having a notch 69 therein for passage therethrough of the suction cup, as well as by a plurality of rollers 70 which engage the upper portion of the envelope. As shown, the plate 68 and rollers 70 are mounted on a post 71 carried by the frame. The envelope remains in this position for a very short period of time as the pin 66 traverses a straight portion 67c of the groove just before the pin enters groove portion 67a to move the suction cup to its outermost position, as shown in FIGURE 8.

During the time the envelope in in the bowed condition of FIGURE 7, the bowed portion of the envelope enters a notch 72 in the periphery of rotating disc 42 and engagement of edge 73 of such notch with such bowed portion will pull the adjoining end portion of the envelope through the notch and thus dispose this end portion of the envelope on the inner face of disc 42. At this instant, the peripheral surface portion 74 of a rotating disc 75, mounted on a driven shaft 76, engages the envelope which is thus frictionally held between portion 74 of the disc 75 and the opposed portion of disc 42 and is moved away from the stack by reason of the rotating movement of the discs. It will be apparent that the speed of movement of portion 74 and the opposed portion of disc 42 will be substantially the same. It will also be apparent that the sequence of operations just described will take place in synchronized order and that will be repeated to feed the envelopes in single file in rapid succession.

As the envelope moves from between discs 75 and 42 its leading edge is nipped between a pair of rollers 77 and 78, the latter of which is driven by means of a driven shaft 79, and thus moved forwardly in its path of movement.

Since, in the treatment of envelopes, it is necessary to swing the closure flap into open or upright relation, means are provided to accomplish this step. Such means comprises a substantially flat plate 80 fixed in upright position on the table and having a flat forward surface 81 parallel to and engageable by the inner surface of each envelope. It will be observed that roller 78 projects through an opening 82 in the plate to locate the nip of rollers 77 and 78 approximately flush with surface 81. Plate 80 has a sharpened edge portion 83 beginning slightly forwardly of the nip of rollers 77 and 78 and rising gradually in height from the table top (FIGURE 3). It will be apparent that, as the envelope is propelled forwardly by the rollers 77 and 78, the closure flap thereof will be engaged by the sharpened edge portion 83 and folded into upright relation to the remaining portion of the envelope.

The envelope is further propelled through its path of movement by means of a succeeding pair of nipping rollers 84 and 85, the latter of which is driven by means of a driven shaft 86. Roller 85 extends through an opening 87 in plate 80.

A reverse turn is now imparted to the path of movement of the envelope by means of a drum 88 mounted in upright position on the table top and driven by means of a driven shaft 89. A plurality of free-running rollers 88a mounted on the table urge the lower portion of the envelope into engagement with the drum for propulsion thereby. The upper portion of the envelope may be supported by a plurality of brushes 90 carried by a frame member 91 and sweeping the upper surface of the drum.

The envelope may be guided into engagement with the drum from rollers 84 and 85 by rollers 92 and 93 carried by a post 94.

After leaving the drum 88, the path of movement continues tangentially thereof in a circular direction as defined by a drum comprising an annular upright wall 95 carried by a disc 96 (FIGURE 11) rotatably mounted on a shaft 97 and driven by means of a ring gear 98 fixed to the disc 96 (FIGURE 18). Wall 95 has a shoulder 99 upon which the envelope is adapted to seat. The envelope is supported on shoulder 99 by a band 100 fixed to the table. Movement is imparted to the envelope by the rotating wall 95 in association with a plurality of engaging idler rollers 101. The upper portion of the envelope as it moves between rollers 101 and wall 95 is supported by a band 102.

As the envelope continues to be moved by the rotating wall 95, a tear strip is applied thereto and to this end the envelope is directed between a pair of nipping rolls 103 and 104 (FIGURES 9, 10, 11). Roll 103 is fixed to a vertically disposed shaft 105 which is driven by a gear 106 from ring gear 98. Roll 104 is fixed to a vertically disposed shaft 107 which is driven in a direction opposite to that of shaft 105 by means of a gear 108 meshing with a gear 109 on shaft 105.

A continuous length of tear strip 110 is also fed between rolls 103 and 104 by means of guide rollers 111, 112 and 113. Strip 110 is preferably composed of linear polyethylene such as that sold under the trade mark "DLP 33" and has one side thereof of pressure adhesive character.

As shown in FIGURE 10, the tear strip 110 is applied to the inner surface of the closure flap 16 of the envelope with the pressure sensitive side of the strip adhesively engaging the flap. It will be observed that the tear strip is parallel to and closely adjacent the fold line of the closure flap.

Since the tear strip as applied is continuous, there will be a short connecting portion of the strip, indicated at 110a, between each envelope and the succeeding envelope. Means are therefore provided to sever or remove this connecting portion 110a. This means comprises a roll 114 fixed on a vertically disposed shaft 115 driven by means of a gear 116 thereon, a gear 117 on shaft 118, and gear 108. The periphery of roll 114 is heated by means of a heating element 119 having connections 120 with a commutator 121 mounted on shaft 115. Brushes 122 on the commutator are connected at 123 to a connector box 124 which is adapted to be connected to a source of electrical power (not shown). A rheostat 125 may be connected into the commutator circuit, as shown, to adjust the heat output of element 119. Means for pressing the tear strip portion 110a against the heated periphery of roll 114 comprises a roller 126 rotatably mounted on a spindle 127 carried by a revolving member such as a disc 128. As shown, two such rollers 126 in diametrically opposed relation are provided on the disc 128, which is fixed on an upright shaft 129 driven by a gear 130 meshing with ring gear 98. Preferably, the radius of revolution of each roller is adjustable by the provision of a radial slot 131 in the disc 128 through which the spindle 127 extends, such spindle being clamped in any desired position by means of a clamping nut 132.

Each roller 126 is composed of a resilient material whereby when pressed against roll 114 a portion 126a (FIGURE 12) of the periphery of roller 126 will assume the peripheral contour of roll 114. It will be understood that the mechanism described is so synchronized in operation that the connecting portion 110a of the strip will be pressed between the portion 126a of roller 126 and the heated periphery of roll 114 and that the frequency of revolution of the roller or rollers 126 is such that each successive connecting portion 110a is applied to the heated roll 114. It will also be apparent that the length of the portion 126a will be equal to and coincide with the length of strip portion 110a. The momentary application of heat in the manner described will sever the portion 110a at precisely its lines of juncture with the edges of the envelopes by melting the strip along these envelope-supported lines. Intervening fragments or pieces of the severed portion 110a, which may adhere to the periphery of roll 114, are preferably removed by brushing with a rotary brush 133 driven by a motor 134 (FIGURE 9).

It is of course desirable that the material of rollers 126 be such as to withstand the high temperatures of roll 114 for long operative periods. While various types of natural and synthetic rubbers may be employed as such material, the synthetic rubbers are to be preferred. For instance, silicone rubber (dimethyl siloxane polymer) possesses satisfactory characteristics for the purpose.

It will be apparent that other types of severing devices may be employed instead of that just described. One such alternative form will now be described with particular reference to FIGURE 13. A driven roll 135 replaces the heated roll 114 on shaft 115 and a pair of cutters 136 replace the rollers 126 on disc 128. Each cutter comprises a plunger 137 reciprocally mounted in a housing 138 and spring-pressed outwardly by a spring 139 the tension of which may be adjusted by a screw 140. The diameter of the outer end of the plunger is equal to the length of strip portion 110a with which such outer end is adapted to coincide as it revolves. The plunger has a length such that pressure will be applied thereon by the hard-surfaced periphery of roll 135 and the plunger slightly retracted against the force of spring 139. This pressure is sufficient to sever the strip portion 110a along its lines of juncture with the envelopes. It is desirable to support the periphery of disc 128 approximately opposite the area of application of pressure by the plunger and this may be effected by providing a pair of rollers 141 rotatably mounted in a bracket 142 and engaging the periphery of disc 128.

The envelopes now proceed along a path of movement defined by a fixed wall 143 and a supporting band 144, movement being imparted to the envelopes by driven rolls 145 on shafts 146.

Means are provided for folding down the upright closure flaps and comprises an arm 147 mounted on a post 148 and having a downwardly inclined end portion 149 in the path of the upright flap. Such end portion 149 engages the flap to fold it downwardly at which time it is engaged by the inclined end portion 150 of a second arm 151 mounted on a post 152 which completes the folding operation.

The path of travel of the envelopes is now subjected to a further turn by means of a drum 153 (FIGURES 15, 16) mounted on a shaft 154 in upright relation on the table and driven by a gear 155 fixed to shaft 154 and meshing with a gear 156 driven from ring gear 98. Idler rollers 157 apply pressure on the envelopes against the drum to propel the envelopes.

The path of travel is now directed in a straight line tangent to drum 153 by means of a belt 158 mounted on pulleys 159 and driven by a pulley 160, the shaft 161 of which is driven by a gear 162 thereon meshing with gear 156. Idler pulleys 163 and 164 cooperate with the belt 158 to propel the envelopes.

The propelled envelopes emerge in single file from a discharge mouth 165 with a speed of travel which carries each envelope completely free of contact with belt 158 and into engagement with a stop strip 166 fixed to a discharge section 167 of the table.

A platform 168 mounted on the table by means of posts 169 and surmounting the moving wall 95 and belt 158 provides protection for these elements as well as support for a frame member 170 in which shafts 105, 107, 115 and 118 are mounted.

In order to stabilize the ejection movement of each envelope, the upper portion thereof is subjected to engagement with a brush 171 and a light flat spring 172 mounted on platform 168 and disposed in the path of travel of the ejected envelope. These elements apply a braking action to the envelope and further move it in a lateral direction. Similarly, the lower portion of the envelope is subjected to the action of a brush 173 mounted on the table.

The elements 171, 172 and 173 move the envelope against the marginal portion of a disc 174 mounted on a shaft 175 and rotated thereby at a predetermined speed. Disc 174 has in its periphery a groove 176 the generally parallel side walls of which extend obliquely across such periphery. The depth of the groove is such that its bottom wall is successively brought into substantially flush relation with the top of the table upon which the envelope rests. One of the side walls of the groove is provided with a laterally protruding curved lip 177 which will successively engage the lower edge of an envelope as the disc rotates. It will be recognized that, in the arrangement illustrated, counterclockwise rotation of the disc will cause an ejected envelope to enter the mouth end of groove 176 and leave from the other end of the groove in laterally displaced position. The envelopes thus laterally fed may be supported on a loosely positioned bar or like 178.

Means for forming the discharged envelopes into an accurately aligned stack may comprise a tamping shoe 179 in opposed relation to stop 166 and carried by a rod 180 reciprocatably mounted in a bracket 181. The rod and shoe are spring-urged away from the stack by a spring 182 on the rod engaging bracket 181 and a collar 183 on the rod. An arm 184 fixed to the rod carries a roller 185 engaging the periphery of an eccentric 186 mounted on a shaft 187 driven by a gear 188 from gear 155.

A plurality of conveyor belts 189 mounted in table section 167 may be provided to convey the envelope stack to discharge rollers 190. The conveyor belts, as shown, are driven by a pulley 191 mounted on a shaft 192 in frame member 193. Shaft 192 is driven by a bevel gear 194, bevel gear 195, shaft 196, bevel gear 197, bevel gear 198, shaft 199, gear 200, gear 201, shaft 202, gear 203, and gear 204 on shaft 175. An idler roller 205 engaging the belt in opposed relation to driving pulley 191 may be provided.

Means for counting the discharged envelopes is preferably provided and, as shown, comprises a helical blade 206 having a hub 207 fixed to a shaft 208 and driven at predetermined speed through bevel gear 209, bevel gear 210 and shaft 196. The helical blade 206 is provided with a generally radially extending leading edge 211. The helical edge portion of the blade projects a short distance into the stack, as shown in FIGURES 15 and 17. Referring particularly to FIGURE 17, it will be observed that, as leading edge 211 enters the stack (with the blade revolving in a counterclockwise direction) it will enter the fold between the closure flap and the body of an envelope and tilt it upwardly as indicated at 14a. Thus, the speed of rotation of the blade may readily be established to tilt an envelope upwardly at periodic intervals in the stack. For instance, every 25th envelope may be so tilted.

As shown in FIGURE 2, the shaft 33 is driven by means of the belt 35 from a power source such as a motor 212. Shaft 33, in the specific arrangement illustrated, is the main driven shaft of the machine and, while any other suitable driving arrangement may be provided, that shown in FIGURE 18 has particular significance, not only in compactness of form, but in the ease with which it may be converted to various other speed ratios.

Shafts 40, 43 and 76 may be drivably connected to main shaft 33 by any suitable driving connection (not shown).

Ring gear 98 is driven from the main shaft by means of gear 130, bevel gear 213 on shaft 129, bevel gear 214, shaft 215, bevel gear 216, and bevel gear 217 on main shaft 33.

Ring gear 98 drives gear 106, gears 79a, 86a and 89a through idler gears 218 and 219, gear 106 with intermeshing gears 162, 155 and 188, and gears 220 through idler gear 221 to drive shafts 146.

Shaft 175 is driven from the main shaft by bevel gear 222, bevel gear 223, shaft 224, bevel gear 225, and bevel gear 226 on main shaft 33.

Since the speed of travel of the envelopes through their path of movement as described is controlled by the speed of a single element, namely, ring gear 98, such speed of travel is constant and may be accurately controlled. Moreover, since the driving elements of the tape applying and severing mechanisms are also driven directly from the ring gear, accurate synchronism of the action thereof is readily accomplished.

Furthermore, since envelopes or other articles vary in size and since, therefore, the frequency of feed and other treatment operations will vary, it is desirable that this may be accomplished in a simple manner. This is accomplished, in the driving arrangement described, simply by replacing gear 130 with a gear of different size.

In order that the polyethylene strip 110 may be supplied to the machine at a speed which will ensure satisfactory application thereof to the articles and such that the articles may be passed through the machine at a high speed, it is desirable that special equipment be provided to apply adhesive to the strip and thereafter feed the strip to the machine. This equipment will now be described with particular reference to FIGURES 19 to 22, inclusive.

The strip handling device is generally indicated at 227 in FIGURE 1, which illustrates the device as mounted on a base plate 228 supported on platform 168.

The device comprises a frame 229 mounted on legs 230. A reel 231 containing a supply of strip 110 has its spindle 232 supported in notched arms 233 carried by the frame. The strip is paid out from the reel by means of a friction roll 234 which rests on the strip roll and which is fixed to a shaft 235 journalled in a frame member 236. Shaft 235 is driven by means of a sprocket 237 fixed thereto, a chain 238, and a sprocket 239 fixed to a driven shaft 240 journalled in main frame 229. Frame member 236 is pivoted by means of collar 241 to shaft 240. A chain tightening sprocket 242 may be provided. It will thus be apparent that the weight of roll 234 and the adjoining end of the frame member will be borne by the reel and that rotation of roll 234 in a counterclockwise direction (as viewed in FIGURE 19) will rotate the reel in a clockwise direction to pay out strip therefrom.

The strip is led initially in an upwardly inclined direction over a pulley 243 suspended from the frame, and thence downwardly over a pulley 244. Pulley 244 is rotatably carried by a rod 245 reciprocally mounted in a bracket 246 fixed to a post 230 and urged in a downward direction by a spring 247 on the rod and engaging a shoulder 248 on the bracket and a shoulder 249 on the rod. The resiliently mounted pulley 244 is for the purpose of taking up any slack that may occur in the paid out strip as a result of variations in the length of the paid out strip caused by the varying positions on the reel from which the strip is withdrawn.

Further, in order to compensate and make necessary adjustments for any variations in speed of the paid out strip, which may result from various causes, including stretching of the strip, a strip accumulator 250 is provided. Such accumulator comprises an auxiliary frame 251 having an upper series of idler pulleys 252 rotatably mounted therein on a fixed axis provided by shaft 253. A second lower series of pulleys 254 in vertically opposed relation to pulleys 252 are also rotatably mounted in the frame on a shaft 255 which however has its ends disposed in vertical slots 256 whereby the series of pulleys 254 may float in a vertical direction. The strip 110 from pulley 244 is trained over the first pulley 254, then upwardly over a first pulley 252, then downwardly over the second pulley 254 and so on. A yoke 257 is carried by shaft 255 and should a break occur in the strip, the series of pulleys 254 will drop to the lower end of the slots 257 in which position the yoke will engage a depressible switch button 258 of a switch 259. The switch 259 is disposed in the main circuit 260 of the power supply for the machine and is adapted to interrupt such supply and stop the machine should a break in the tear strip occur.

Also carried by the shaft 255 is a bar 261 having an upper lateral projection 262 and a lower lateral projection 263. Mounted on frame 251 by means of a bracket 264 is a mercury switch 265 which is connected through a junction box 266 to a solenoid 267 having an actuating plunger 268. Should shaft 255 of pulleys 254 drop to a predetermined level as a result of slackness in the strip, projection 262 will actuate switch 265 to energize solenoid 267. When, however, such slackness is taken up and shaft 255 with pulleys 254 rise to a lever where projection 263 engages switch 265, the latter will be actuated to de-energize the solenoid 267.

As shown, in FIGURE 19, solenoid 267 is mounted on frame member 236 and plunger 268 is pivotally connected at 269 to an arm 270 which in turn is pivotally mounted at 271 to frame 236. Arm 270 has an inclined end portion 272 on which is mounted a cylindrical shoe 273 overlying the coil of strip on reel 231 and normally slightly spaced therefrom. When solenoid 267 is energized, plunger 268 moves upwardly to swing shoe 273 downwardly into engagement with the strip coil. By reason of the pivotal mounting of frame 236 and the elements carried thereby, pressure on the strip coil by shoe 273 will also swing the adjacent end of frame 236 slightly upwardly to disengage roll 234 from the strip coil. Shoe 273 will thus act as a brake to arrest or slow down the rotary movement of reel 231. As soon as the slack in the strip is taken up by the pulleys 252 and 254 and shaft 255 rises, the solenoid is de-energized by engagement of projection 263 with switch 265.

The strip now extends over an abrasive wheel 274 fixed to a driven shaft 275 journalled in the main frame. Wheel 274 lightly abrades the lower surface of strip 110 preparatory to application of adhesive thereto.

The strip is then led under an idler pulley 276 and thence upwardly over an adhesive-applying wheel 227 fixed to a shaft 278 driven by a sprocket 279. Wheel 277 depends into a bath 280 adapted to contain adhesive. Wheel 277 has a lightly pocked surface 281 to facilitate retention of a layer of adhesive thereon when it moves out of the bath. Means may be provided for accurately determining the thickness of the layer of adhesive on the peripheral surface 281 and, as shown, comprises a U-shaped plate 282 mounted on the top of the bath and having an edge 283 adjustably spaced from the surface 281. Adjustment of such spacing is effected by mounting the plate on the bath with screws 284 which extend through slots 285 in the plate. A screw 286 fixed to the plate with locknut 287 may be employed to adjust the position of the plate.

Following application of adhesive to the strip, it is necessary that the strip be subjected to a drying period before application to the envelopes or other articles. To this end, the strip is subjected to a relatively long path of travel. A plural-grooved pulley 288 is fixed to shaft 240 and a second plural-grooved pulley 289 is fixed to shaft 275 in opposed relation to pulley 288. The strip is directed by means of an idler pulley 29 into the first groove of pulley 288 and is then trained back and forth in the grooves of pulleys 288 and 289 whereby it requires a period of time, say 15 to 20 seconds, for the strip to traverse such pulleys.

Shafts 240 and 275 and sprocket 279 are driven by means of a sprocket 291 on shaft 240, sprocket 292 on shaft 275, chain 293, bevel gear 294 on shaft 275, bevel gear 295 on shaft 296, and gear 109 on shaft 105. A chain-tightening idler sprocket 298 may be provided.

As the strip moves from the last groove of pulley 289 it is directed through a second accumulator 299 where it is again subjected to a slack take-up and speed control. Accumulator 299 is similar in structure to accumulator 250 and includes a frame 300, an upper series of pulleys 301 on a fixed axis shaft 302, a lower series of pulleys 303 on a shaft 304 having vertical sliding movement in slots 305, a bar 306 fixed to shaft 304 having upper and lower switch actuating projections 307 and 308, and a mercury switch 309 mounted on bracket 310. In this case, however, switch 309 is in a circuit 311 of a magnetic clutch 312 interposed in driven shaft 275. The arrangement is such that when pulleys 303 drop to a predetermined level, switch 309 will be actuated to de-energize the clutch 312 and thus interrupt the drive until there is sufficient tension in the strip to raise the pulleys 303 and thus again actuate the switch to energize the clutch.

From the accumulator 299, the strip 110 is led over pulley 111 and thence as heretofore described.

While most of the elements of the machine described will be formed of metal, it is desirable that certain elements be of plastic composition. Such elements include the brake member 273 and the pulleys 252, 254, 288, 289, 301 and 303. Such plastic composition is preferably of the type sold under the trademark "Teflon."

I claim:
1. A tear strip applying machine which comprises
   (a) an article supporting table,
   (b) means defining a path of travel on said table having an entrance end and an exit end,
   (c) a plurality of article moving devices mounted on said table in successively arranged relation along said path of travel,
   (d) one of said article moving devices comprising a pair of article-receiving nipping rolls,
   (e) means for driving one of said rolls,
   (f) means for feeding a tear strip between said rolls,
   (g) each of several others of said article moving devices comprising a drum mounted on said table and having its axis disposed in perpendicular relation thereto, said drum having a cylindrical article-engageable wall,
   (h) and means for rotatably driving each of said drums,
   (i) each of said drum walls being tangentially disposed with respect to another of said drum walls.

2. A tear strip applying machine as defined in claim 1, including
   (j) article stacking means adjacent said entrance end of said path of travel,
   (k) and means for feeding articles from said stack in single file into said path of travel comprising an arm swingably mounted on said table about a vertical axis, a suction cup mounted on the free end of said arm, and means for swinging said free end towards and away from said stack in a fixed pattern of movement including a cylindrical member, driving means for rotating said member about its axis, said member having a continuous cam groove in its cylindrical surface, and a pin fixed to said arm and extending into said groove.

3. A tear strip applying machine as defined in claim 1, including
   (j) article stacking means adjacent said entrance end of said path of travel,
   (k) means feeding articles from said stack in single file into said path of travel,
   (l) article stacking means adjacent said exit end of said path of travel, and
   (m) article counting means comprising a stack-engaging helical blade, and means for rotating said blade about its axis, said blade having an article-engaging radially extending edge.

4. A machine for applying tear strips to envelopes which comprises
   (a) a supporting table,
   (b) means defining a path of travel on said table having an entrance end and an exit end,
   (c) a plurality of envelope moving devices mounted on said table in successively arranged relation along said path of travel,
   (d) envelope stacking means adjacent said entrance end of said path of travel,
   (e) means for feeding envelopes from said stack in single file into said path of travel,
   (f) an envelope closure flap opening member mounted on said table in said path of travel,
   (g) one of said envelope moving devices comprising a pair of envelope-receiving nipping rolls,
   (h) means for driving one of said rolls,
   (i) guide rollers feeding a tear strip between said rolls,
   (j) a tear strip severing device mounted on said table in said path of travel following said nipping rolls,
   (k) an envelope closure flap closing device mounted on said table in said path of travel following said severing device,
   (l) and envelope stacking means adjacent said exit end of said path of travel.

5. A machine for applying tear strips to envelopes as defined in claim 4, said closure flap opening member comprising a plate having a closure flap engaging edge arranged to swing said flap into open position, said edge being disposed in said path of travel and being of gradually increasing height with respect to said table.

6. A machine for applying tear strips to envelopes as defined in claim 4, said envelope moving devices including first, second and third drums each mounted on said table about a vertical axis and each having an envelope-engaging cylindrical wall, each said drum wall being substantially tangent to one of said other drum walls, said second drum having a substantially greater diameter than that of either of said other drums.

7. A machine for applying tear strips to envelopes as defined in claim 6, each of said drums having a driving gear fixed thereto, a plurality of intermeshing gears drivably connecting said gear of each of said first and third drums with said driving gear of said second drum.

8. A machine for applying tear strips to envelopes as defined in claim 7, including a driving gear fixed to said severing device and meshing with said second drum gear.

9. A machine for applying tear strips to envelopes as defined in claim 8, including a train of gears drivably connecting said rolls and said severing device driving gear.

10. A tear strip applying machine which comprises
 (a) an article supporting table,
 (b) means defining a path of travel on said table,
 (c) a plurality of article moving devices mounted on said table in successively arranged relation along said path of travel,
 (d) one of said article moving devices comprising a pair of article-receiving nipping rolls,
 (e) means for driving one of said rolls,
 (f) a tear strip supply reel,
 (g) a plurality of guide rollers for directing a tear strip from said reel to said nipping rolls,
 (h) an adhesive applying bath disposed between a pair of said guide rollers and receiving said tear strip,
 (i) a drying rack for adhesive-coated tear strip comprising a frame, a first series of tear strip supporting pulleys rotatably mounted in said frame on a common axis, and a second series of tear strip supporting pulleys rotatably mounted in said frame on a second common axis, said drying rack being located between said bath and said pair of nipping rolls, and
 (j) a slack take-up and strip speed controlling device at each end of said drying rack, each said device comprising an auxiliary frame, a first series of pulleys rotatably mounted in said auxiliary frame about a fixed axis, a second series of pulleys rotatably mounted in said auxiliary frame about a floating axis, a switch actuatable in response to movement of said floating axis to a predetermined plane, electrical means energizable in response to actuation of one of said switches to arrest rotation of said reel, and electrical means energizable in response to actuation of the other of said switches to arrest rotation of said two series of supporting pulleys.

References Cited by the Examiner

UNITED STATES PATENTS

| | | |
|---|---|---|
| 2,776,639 | 1/1957 | Labine et al. _____ 93—1 X |
| 2,969,105 | 1/1961 | Jones. |

FOREIGN PATENTS

| | | |
|---|---|---|
| 600,889 | 8/1934 | Germany. |
| 701,586 | 1/1941 | Germany. |

BERNARD STICKNEY, *Primary Examiner.*